US012682552B2

(12) United States Patent
Neal et al.

(10) Patent No.: US 12,682,552 B2
(45) Date of Patent: Jul. 14, 2026

(54) AI METHODS FOR TRANSFORMING A TEXT PROMPT INTO AN IMMERSIVE VOLUMETRIC PHOTO OR VIDEO

(71) Applicant: Lifecast Incorporated, Menlo Park, CA (US)

(72) Inventors: Lawrence Wayne Neal, Salem, OR (US); Forrest Briggs, Palo Alto, CA (US)

(73) Assignee: Stevens Law Group, P.C., San Jose, CA (US)

( * ) Notice: Subject to any disclaimer, the term of this patent is extended or adjusted under 35 U.S.C. 154(b) by 371 days.

(21) Appl. No.: 18/476,670

(22) Filed: Sep. 28, 2023

(65) Prior Publication Data

US 2024/0112394 A1      Apr. 4, 2024

Related U.S. Application Data

(60) Provisional application No. 63/411,513, filed on Sep. 29, 2022.

(51) Int. Cl.
| | |
|---|---|
| *G06T 15/10* | (2011.01) |
| *G06F 40/40* | (2020.01) |
| *G06T 5/77* | (2024.01) |
| *G06T 13/20* | (2011.01) |
| *G06T 19/00* | (2011.01) |

(52) U.S. Cl.
CPC .............. *G06T 15/10* (2013.01); *G06F 40/40* (2020.01); *G06T 5/77* (2024.01); *G06T 13/20* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,754,379 B2 * | 6/2004 | Xiong .................... | G06V 10/24 |
| | | | 382/294 |
| 9,618,747 B2 * | 4/2017 | Villmer ................... | G06T 11/60 |
| 2011/0188773 A1 * | 8/2011 | Wei ........................... | G06T 5/70 |
| | | | 382/260 |

(Continued)

OTHER PUBLICATIONS

Dickson et al., Benchmarking Monocular Depth Estimation Models for VR Content Creation from a User Perspective, Dec. 31, 2021 , 1-5 (Year: 2021).*

(Continued)

*Primary Examiner* — Robert J Craddock

(74) *Attorney, Agent, or Firm* — David R. Stevens; Stevens Law Group

(57) ABSTRACT

A text-to-image prompt is processed using a text-to-image machine learning model to obtain a non-immersive (e.g., rectilinear image). The non-immersive image may be enhanced by a superresolution machine learning model and processed with a monoscopic depth estimation model to obtain a depthmap. The non-immersive image and the depthmap may be converted to an immersive projection (e.g., F-theta) and corresponding depth map. The immersive projection may be out-painted. The immersive projection may be used to generate video with simulated camera movement, output on a VR headset, and/or processed to remove a background layer and displayed on an AR headset, or on an holographic glasses-free three-dimensional display.

20 Claims, 5 Drawing Sheets

(56) References Cited

U.S. PATENT DOCUMENTS

| 2024/0037810 | A1* | 2/2024 | Gong | ..................... | G06F 40/30 |
| 2024/0095463 | A1* | 3/2024 | Leary | ..................... | G06F 40/20 |

OTHER PUBLICATIONS

Sabini et al. Painting Outside the Box: Image Outpainting with GANs, Aug. 25, 2018, 1-5 (Year: 2018).*

Gordon et al., Background estimation and removal based on range and color, Dec. 31, 1999, 1-6 (Year: 1999).*

* cited by examiner

AI METHODS FOR TRANSFORMING A TEXT PROMPT INTO AN IMMERSIVE VOLUMETRIC PHOTO OR VIDEO

RELATED APPLICATIONS

This application claims the priority benefit of U.S. Provisional Application Ser. No. 63/411,513, filed on Sep. 29, 2022, the disclosure of which is hereby incorporated by reference herein in its entirety.

This application is related to the following applications, all of which are hereby incorporated herein by reference in their entirety:

U.S. Patent Application No. 63/223,232 filed on Jul. 19, 2021,

U.S. Patent Application No. 63/253,072 filed on Oct. 6, 2021,

U.S. Patent Application No. 63/253,076 filed on Oct. 6, 2021,

U.S. Patent Application No. 63/274,831 filed on Nov. 2, 2021,

U.S. patent application Ser. No. 17/867,036 filed on Jul. 18, 2022,

U.S. patent application Ser. No. 17/961,051 filed on Oct. 6, 2022,

U.S. patent application Ser. No. 17/961,135 filed on Oct. 6, 2022,

U.S. patent application Ser. No. 17/979,514 filed on Nov. 2, 2022.

TECHNICAL FIELD

The present disclosure relates to systems and methods related to the generating media, such as media used in virtual reality, augmented reality, and mixed reality systems.

BACKGROUND

The term "immersive" is used to describe photos or videos with sufficient resolution and field of view to enable a user to be immersed in the scene in virtual reality (VR). For example, there are various formats for immersive VR photos and videos, which are 2D or 3D and have 180 degree field of view or 360 degree field of view.

Many VR photo and video formats approximate 3D with one precomputed image for the viewer's left eye, and another for their right eye. This includes several formats, such as VR180, stereo 360, omnidirectional stereo (ODS), etc. This approach produces incorrect 3D rendered views in many cases. The rendered views that a user sees while viewing such formats can only respond to their head rotating, but not to translation. This approach can also be categorized as 3-degrees of freedom (3DOF), which is rotation-only.

In contrast, some formats for VR photos and videos (or 3D photos and videos outside the application of VR in general), are 6-degrees of freedom (6DOF), which means the rendered views can respond to both rotation and translation of the virtual camera. In practice, 6DOF requires some kind of 3D model of each frame of video. Given this 3D model, it is possible to render the scene from new viewpoints.

The term "volumetric video" is commonly used to refer to any format of video that contains a proper 3D model of each frame. Technically, only methods which represent each point in 3D space should be considered volumetric (such as voxels or radiance fields), but it is common to also refer to triangle meshes, and other 3D representations as "volumetric." Other representations, such as depthmaps or any other suitable representation that enables 6DOF rendering are often also considered to be "volumetric."

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
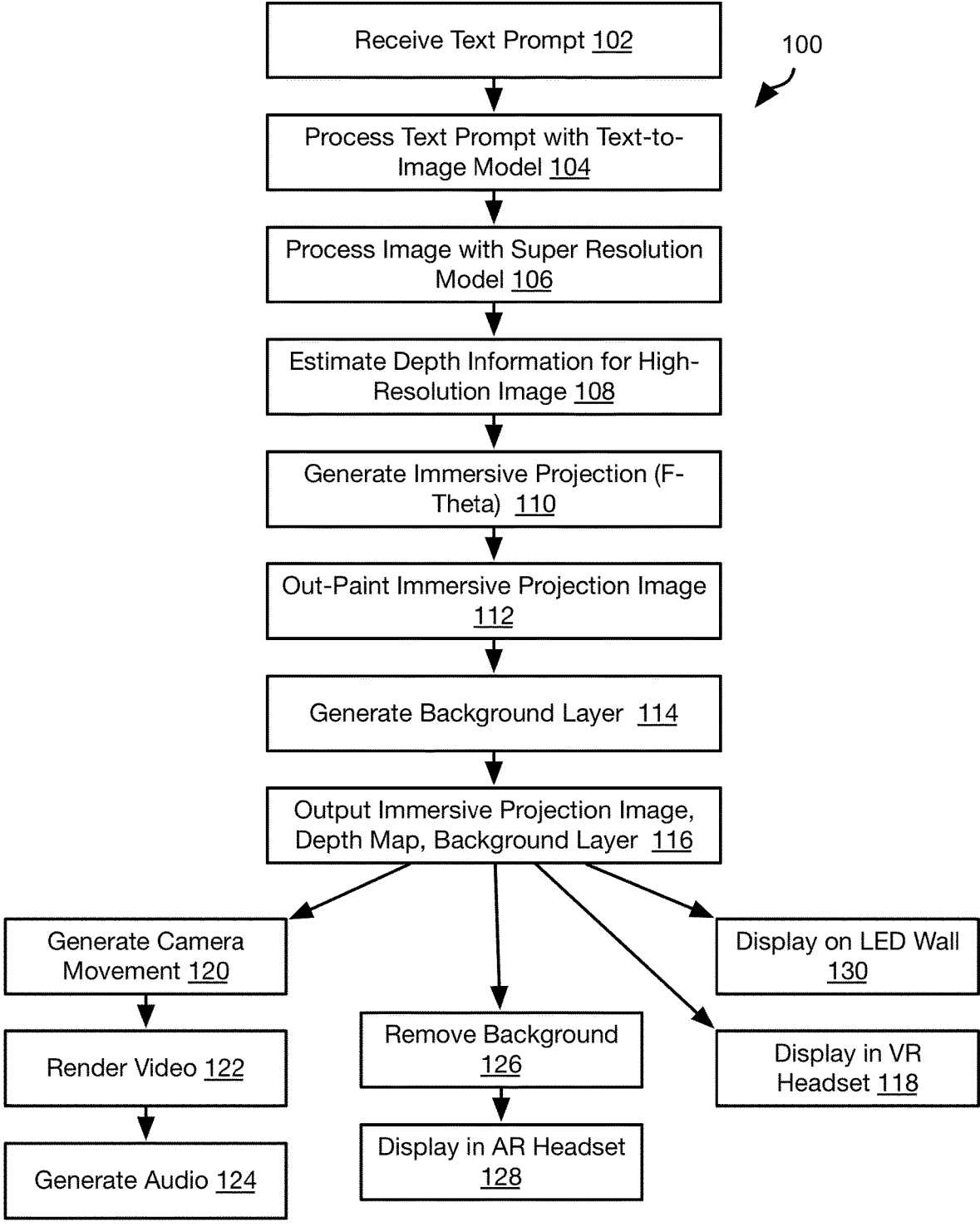
FIG. 1 is a process flow diagram of a method for generating volumetric images, including video, from a text prompt in accordance with an embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" or "some embodiments" means that a particular feature, structure, or characteristic described in conjunction with the embodiment can be included in at least one embodiment of the invention. The appearances of the phrase "in one embodiment" in various places in the specification do not necessarily all refer to the same embodiment.

Prior work in the field of machine learning has led to the development of models with interesting capabilities. For example, text-to-image models produce an image based on a text description of the desired contents (e.g., DALLE, Midjourney, Stable Diffusion). Super resolution models produce a higher-resolution version of an image given a lower resolution version (e.g., ESRGAN). Monoscopic depth estimation models produce an estimated depthmap given a single input image (e.g., MiDaS). In-painting and out-painting models fill in missing parts of an image, while leaving other parts alone based on a mask of what is to be painted (e.g., Stable Diffusion, various generative adversarial networks (GANs)). Language models (e.g., GPT-3) can have a conversation or answer questions in text. Speech-to-text models convert human speech into text.

The term 'model' above is used in the way that is common to the field of machine learning, and refers to a combination of artificial neural network components, and other computing primitives common in programming languages (e.g., variables, control flow operators, etc.). Models can often be viewed as a graph. The field of deep learning focuses on models which are represented by graphs that enable efficient calculation of the gradient of a loss function with respect to unknown parameters of the model, thereby enabling learning the unknown parameters ("training the model") via numerical optimization methods such as stochastic gradient descent. The models mentioned above are examples and applications of deep learning.

In the field of computer vision, there are equations which describe the relationship between an image and the 3D geometry of a scene. For example, with an equation describing a particular camera, it is possible to determine the 2D pixel coordinate where a point in 3D space is observed, and to find the ray (origin and direction vectors) corresponding to a given 2D pixel. The equations are different depending on the "projection" of the lens. For example, fisheye lenses are commonly described using the F-theta projection (also known as equiangular projection). Most images are not fisheye, and instead are better described using rectilinear projection (where straight lines in 3D space correspond to straight lines in the 2D image).

The term projection is not only used to describe lenses. It is also used in immersive media/VR videos and photos to describe a particular set of equations for wrapping a rectangular texture around some or all of a sphere, which is part of the definition of a format in which the photo or video is stored. Similarly, a map of the earth is a way of wrapping a rectangular image around a sphere. For example, equirectangular projection and cubemap projections are commonly used for storing 2D and 3D photos and videos with 180 or 360 degree field of view. Equirectangular projection is also commonly used for maps of the earth. F-theta/equiangular projection may also be used here as well, although this is less common.

Referring to FIG. 1, the method 100 may be used to generate an immersive image suitable for 6DOF rendering and viewing in VR in response to a text description of the scene from the user. In some embodiments, the method 100 may use several artificial intelligence models and other components to process a text prompt to produce a an immersive image that can be used to create three-dimensional renderings. A user is therefore enabled to simply describe what they want to see and receive a three-dimensional scene matching their description.

The term "immersive image" shall be understood as referring to any of an immersive still image, immersive video, volumetric image, volumetric video, or any other representation of a scene that may be used to render a VR images or video with 3DOF or 6DOF. The method 100 may be executed by a computing device 400 as described below with respect to FIG. 4. Inputs to the method 100 from a user, including an instruction to invoke the method 100 itself, may be received from a remote user by way of a user device communicating with the computing device 500 by way of a wired and/or wireless network, such as the Internet. Inputs received from a user and actions performed by a user may be understood as being received from such a user device or input directly by the user to an input device of the computing device 500.

The method 100 may include receiving 102 a text prompt from the user. The text prompt will typically be a description of a scene. The text prompt may specify types of objects, types of people (gender, race, profession, fantasy role, etc.), real or mythical animals, or plants. The text prompt may specify a setting (dessert, jungle, forest, outer space, city, town, fantasy village or city, alien planet or city, etc.), or any other information. The text prompt may specify the relative locations of any of the above-mentioned entities (in front of, behind, to the side of, in foreground, in background etc.). The text prompt may specify a collective or individual action and an object of such action that is performed by any of the entities referenced in the text prompt. The text prompt may specify attributes of any of the entities referenced in the text prompt.

The method 100 may include processing 104 the text prompt with a text-to-image artificial image model to obtain a non-immersive image, such as DALL-E 1 or DALLE-2, Midjourney, Stable Diffusion, or other machine learning model, such as a deep neural network (DNN), generative adversarial network (GAN), or other type of machine learning network. As used herein, unless explicitly stated otherwise, a non-immersive image shall be understood as a rectilinear image including a two-dimensional array of pixels, each having one or more color channels (RGB) for each pixel and possibly other channels, such as an alpha channel. Likewise, a non-immersive image may be a single two-dimensional image or a sequence of multiple two-dimensional images forming a video file, possibly with two or more accompanying audio channels.

In some embodiments, the non-immersive image may be of limited resolution. Accordingly, the method 100 may include processing 106 the non-immersive image with a super resolution machine learning model to obtain a high-resolution non-immersive image, such as the enhanced super-resolution generative adversarial network (ESRGAN) described in Wang, X. et al. (2019). ESRGAN: Enhanced Super-Resolution Generative Adversarial Networks. In: Leal-Taixé, L., Roth, S. (eds) Computer Vision—ECCV 2018 Workshops. ECCV 2018. Lecture Notes in Computer Science, vol 11133. Springer, which is hereby incorporated herein by reference in its entirety.

Where the non-immersive image is a series of images, the super-resolution machine learning model may process the series of images as a group to obtain a series of high-resolution images. Processing the series of images as a group helps avoid inconsistencies between the high-resolution images that would manifest as jerky or unnatural variation and movement when played back as a video.

The method 100 may include processing the high-resolution non-immersive image to estimate 108 depth information for the high-resolution non-immersive image. Step 108 may be performed using one or more Monoscopic depth estimation models (MDEM) to produce an estimated depthmap for the high-resolution non-immersive image. As for step 106, where the high-resolution non-immersive image is a series of images, step 108 may include processing the series of images as a group to take advantage of depth information provided by variation in viewing angle and position across the series of images and to maintain consistency across the series of images. Accordingly, step 108 may include generating a depthmap for a single still image or for each image in a series of images output by the super resolution model.

The method 100 further includes generating 110 an immersive projection using the high-resolution non-immersive image and the depth information obtained at step 108. Generating at step 110 may be performed using any algorithm for generating any of the types of immersive images described above. For example, step 110 may include generating an F-theta projection, inflated F-theta projection, or other projection and a corresponding depthmap from the high-resolution image and the depthmap. Alternatively, an equirectangular projection or other type of projection may be used. Where the high-resolution non-immersive image is a series of video images, step 110 may be performed individually for each image using the depthmap for each image in the same manner as for a single still image.

Generating the immersive projection may result in warping of the high-resolution non-immersive image in correspondence with warping induced by a specified lens or by a particular media format. This warping may be implemented by building a lookup table which specifies, for each pixel in the output projection, which pixel in the input image (the high-resolution non-immersive image) to sample (possibly with non-integer coordinates). The output projection may then be obtained by sampling pixels from the input projection with bilinear interpolation, bicubic interpolation, other interpolation, or using the texture lookup capabilities of a GPU. The pixel coordinates to sample can be derived from the equations for a lens projection and/or media projection. In some embodiments, step 110 may include warping the high-resolution non-immersive image (a rectilinear image), and includes performing this sampling process to transform the high-resolution non-immersive image and depthmap to a partial F-theta image and corresponding depthmap.

The depthmap corresponding to the immersive projection may be obtained from the depthmap of the non-immersive projection. The value of a pixel in a depthmap has a different meaning depending on the projection of the depthmap. For examples, in a rectilinear projection (such as the non-immersive image), the depthmap values correspond to distance along a Z axis parallel to the viewing direction. In F-theta projection, the depthmap values correspond to a distance radially out from the center of a spherical coordinate system. In some embodiments, the depthmap corresponding to the non-immersive projection may include more than warping a depthmap in one projection into another projection using a lookup table to specify which pixel from the source image goes to each pixel in the destination image. Some further transformation of the depth values themselves may be performed to account for the different geometries of projections and meaning of values in the depthmaps. In some cases, it is possible or necessary to use additional information to make this transformation more accurate, e.g., the focal length (known or inferred) of the rectilinear image. For example, the focal length may be obtained from metadata of an image or obtained from a known configuration of a camera used to obtain the image or inferred to be used.

A consequence of generating the immersive projection while transforming the depthmap values as described above when warping between projections, (e.g., F-theta or equirectangular) is that lines which should be straight in the real 3D world are more likely to be straight in the immersive volumetric scene of the immersive image. Without this approach, the resulting immersive volumetric scenes are likely to be warped and bent in ways that are not as plausible, comfortable, or immersive for a viewer.

The method 100 may include out-painting 112 the immersive projection. For example, the immersive projection may be a "partial" projection in the sense that the projection of the high-resolution non-immersive image will only occupy part of the field of view of the immersive projection. Specifically, the rectilinear image will not have 180 degree or 360 degree field of view (FOV) sufficient to cover half or all of a sphere. Instead, the high-resolution non-immersive image will have an FOV that is less than 180. The FOV may be chosen arbitrarily for the purpose of calculating the warp lookup table or may be selected based on estimation of the field of view of the high-resolution non-immersive image based on items represented therein.

Figures 2A, 2B, 2C:
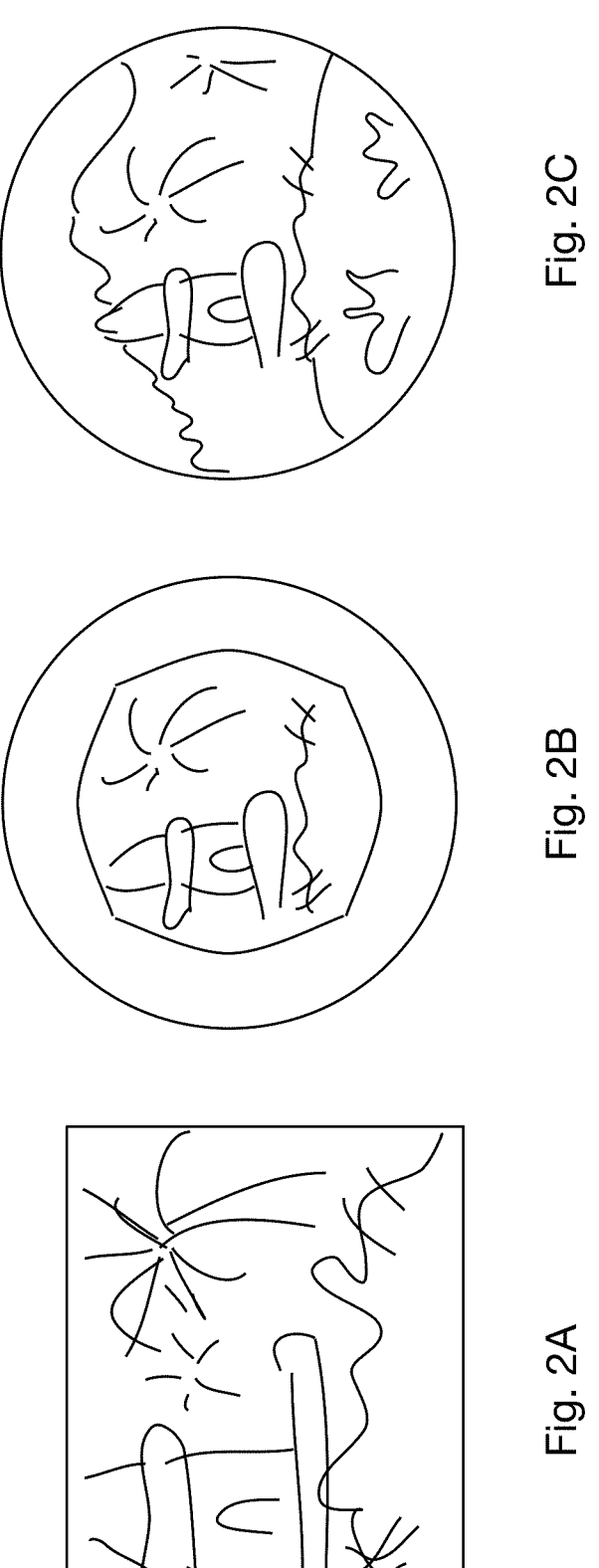
FIGS. 2A to 2D illustrates an example of out-painting of an immersive image in accordance with an embodiment of the present invention.

Referring to FIGS. 2A to 2C, the high-resolution non-immersive image (FIG. 2A) is projected onto a spherical or hemispherical surface (FIG. 2B) but occupies only a part of that surface. Accordingly, step 112 may include out-painting the immersive projection such that all pixels of the immersive projection include image information, e.g., pixel color and depthmap value, as shown in FIG. 2C. In a first approach, the immersive projection is out-painted, i.e., information for pixels is added using an out-painting machine learning model. The first approach has the deficiency that the out-painting machine learning model is most likely trained with rectilinear images and therefore may not accurately generate pixel values for an immersive projection. Likewise, the resolution of the out-painting machine learning model may be inadequate for some applications. However, for an out-painting machine learning model trained with immersive projections (e.g., F-theta), the first approach may be adequate.

In a second approach, the high-resolution non-immersive image is out-painted first to obtain an extended image that is then warped to obtain the immersive projection and corresponding depth map with the extended image occupying substantially all, e.g., from 90 to 100 percent, of the immersive image. In a third approach the non-immersive image is out-painted to obtain an extended image, the extended image is processed with the super resolution machine learning model to obtain a high-resolution extended image, and the high-resolution extended image is then warped to obtain the immersive projection and corresponding depth map with the extended image occupying substantially all, e.g., from 90 to 100 percent, of the immersive image.

Figure 2D:
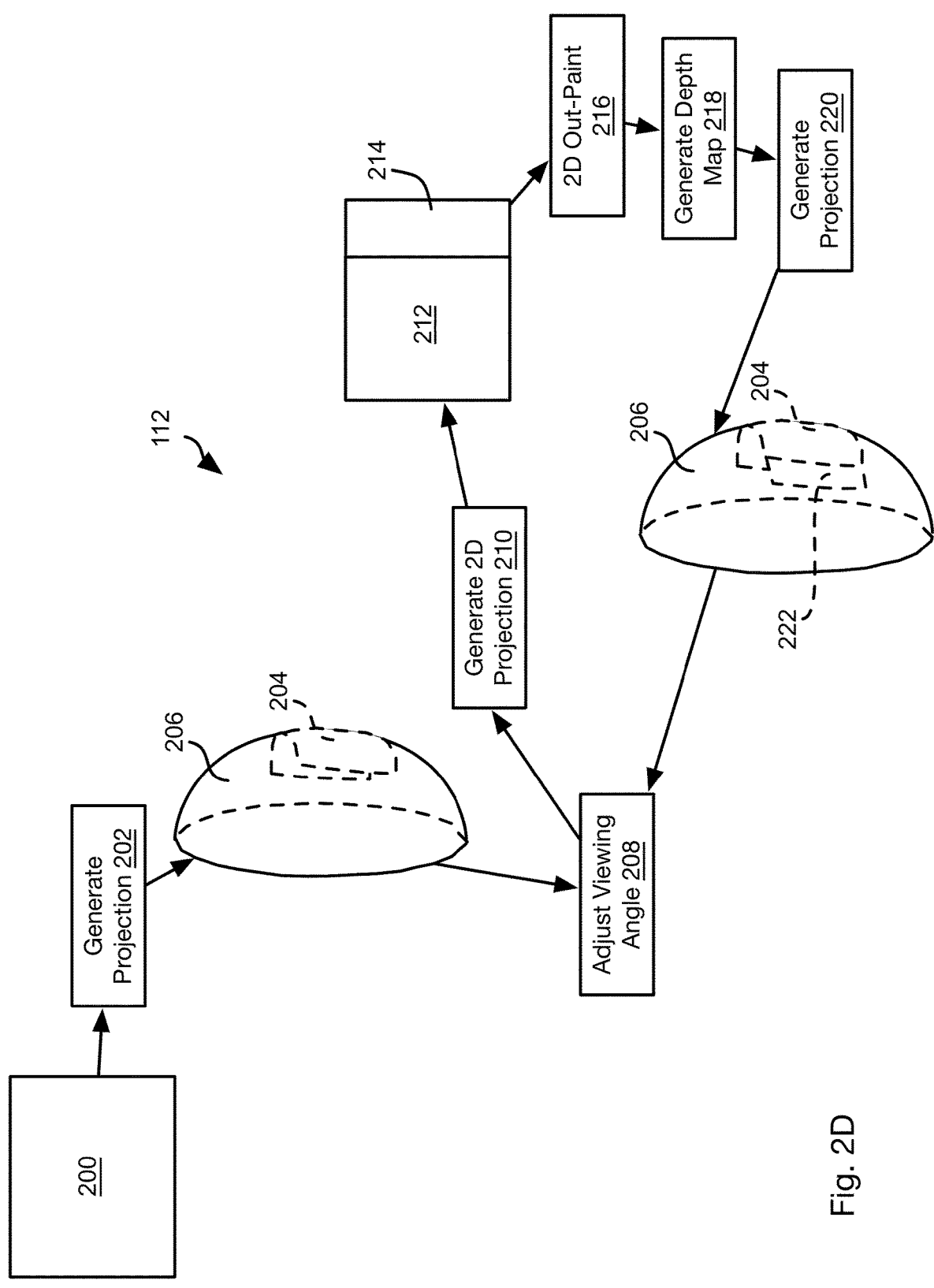

FIG. 2D illustrates an iterative approach for out-painting 112 that takes into account the rectilinear bias of the out-painting machine learning model. The high-resolution non-immersive image 200 is processed 202 to generate an initial immersive projection. As shown, this includes a projection onto a hemispherical or spherical surface 206, though the immersive projection itself may be represented as a two-dimensional array of pixels. As shown, the projection 204 of the high-resolution non-immersive image 200 occupies only a portion of the surface 206.

The iterative approach of FIG. 2D may therefore include adjusting 208 a viewing angle. For example, the high-resolution non-immersive image 200 may be mapped to a center of the surface 206 such that the center of the high-resolution non-immersive image 200 maps to a point (i.e., origin point) on the surface 206. The surface 206 may also define a center, i.e., the point equidistant from all points on the surface 206. The initial viewing angle may be understood as a FOV centered on a line extending from the center to the origin. Adjusting the viewing angle may therefore include adjusting the FOV to be along a line passing through the center and a point on the surface 206 that is offset from the origin. The size of the FOV may be the same size calculated or assumed for the FOV at step 110 or a different size.

A rectilinear projection of the surface 206 is then performed at step 210 to obtain a rectilinear image. As shown, due to the change in viewing angle, the resulting rectilinear image will include a portion 212 that includes information from the original high-resolution non-immersive image 200 and a portion 214 that is blank due to being a projection of a portion of the surface 206 that is blank. Step 112 may then include out-painting 216 the two-dimensional projection such that the portion 214 will now include out-painted pixels. Out-painting 216 may include using any out-painting model known in the art. The out-painting model may have been trained using readily available rectilinear images.

The size of the portion 214 may vary. For example, the portion 214 may be from 1 to 200 rows or columns of pixels in one or two dimensions. A depthmap of the out-painted image may also be generated 218, either for the whole image or for the portion 214 that was out-painted. Generating 218 the depthmap may be performed as described above with respect to step 108. Steps 216 and 218 may be performed for a series of images. In particular, out-painting may be performed for a series of images as a group to facilitate consistency and avoid jerky or unnatural variation among the images when played back as video.

The result of out-painting 216 and generating 218 the depthmap may then be projected 220 back onto the surface 206, i.e., with the FOV centered along the adjusted viewing angle from step 208. Accordingly, a portion 222 of the projection onto the surface 206 will now be filled in with information from the out-painted pixels from step 216.

Step 112 may include repeating again from step 208 with the selection of a new viewing angle having the FOV including a portion of the surface 206 that has not been out-painted. Steps 208-218 may be repeated until out-painting has been performed for all of the surface 206.

Referring again to FIG. 1, as is apparent, following step 112, a text prompt received at step 102 will have been converted into a full immersive projection (180 or 360 degree FOV) and corresponding depthmap, which may include a series of immersive images, each with a corresponding depthmap. Once obtained, the immersive projection may be used in many ways. In some applications, it may be helpful to process the immersive projection and depthmap to generate 114 a background layer. The background layer contains images and depth maps corresponding to parts of the scene that are only visible when looking behind foreground objects. The background layer may include representations of a floor, ground area, buildings, plants, or other static structures of an image. The background layer may be generated using a machine learning model using any approach known in the art. Generating 114 the background layer may further include inpainting portions of the background that are obscured by representations of entities in the immersive projection.

The immersive projection and corresponding depthmap, and possibly the background layer, may then be output 116 for use by another process, for storage for later use, or for any other purpose. The immersive projection and corresponding depthmap, and possibly the background layer, may be provided to a VR or three-dimensional rendering system in order to render left and right images for displaying 118 in a VR display device (e.g., headset), three-dimensional display viewable with or without corresponding glasses, a three-dimensional holographic display that does not require viewing with glasses, or other device capable of displaying a three-dimensional scene. The VR rendering system may track the head position and orientation of the user, and select the point of view from which to render the portion of the immersive projection. Rendering the immersive projection may include mapping the immersive projection to a triangle mesh defined by the corresponding depthmap and then rendering images of the triangle mesh from a point of view of the viewer based on detected movement of the VR headset.

Figure 3:
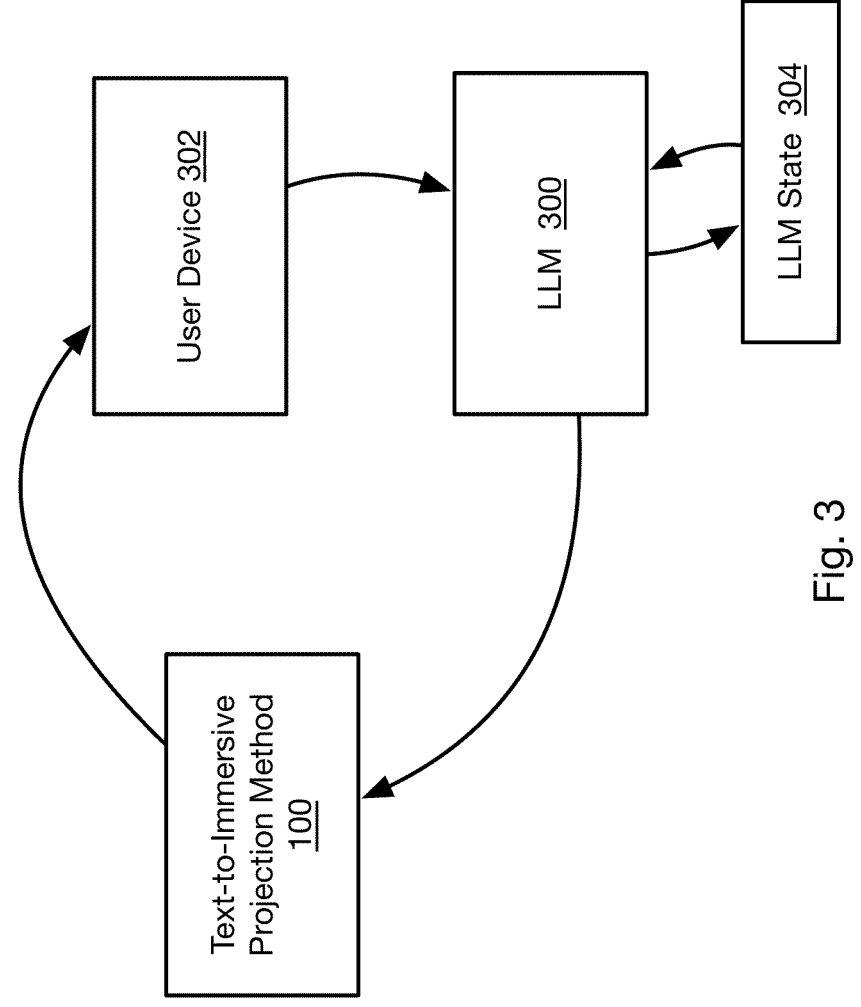
FIG. 3 illustrates an iterative text-to-immersive image loop in accordance with an embodiment of the present invention.

The immersive projection and corresponding depthmap, and possibly the background layer, may also be used in various other more complex ways. For example, for a still immersive projection, a simulated camera movement (rotation and or translation) with respect to the surface 206 may be generated 120. The simulated camera movement may include a location and orientation of a virtual camera at each time point in a series of time points. For each time point, a frame of video may be rendered 122 by from the location and orientation corresponding to each time point. An audio track corresponding to the rendered video may be generated 124. Generating 124 audio may include using pre-recorded tracks and performing operations such as trimming, mixing multiple tracks, or performing other operations. Generating audio may include using a text-to-speech algorithm to convert text to spoken words, such a text from a user or that is automatically generated (see FIG. 3 and corresponding description). An audio track may be obtained by querying a database of sounds, using a text-to-sound model. The audio track may provide a background soundscape for the scene to increase the user's immersion.

In another example, the background layer may be removed 126 and the remaining portion of the immersive image and corresponding depth may then be displayed 128 using an augmented reality (AR) display device, e.g., headset. In particular, entities represented in the immersive projection may be rendered on top of images captured by a camera of the AR headset to give the illusion that the entities are present in the real world. Modification of the renderings of the entities based on movement of the AR headset may be performed using any approach known in the art.

In another example, the immersive projection may be projected onto a surface, then displayed 130 on an LED screen, whether flat or cylindrical and of whatever size. For example, the LED screen may be implemented as an LED wall which is used in "virtual production" (wherein a 3D environment is displayed on a device such as an LED wall, behind real objects and actors using a real-time rendering engine, and the entire scene consisting of both real objects and an LED wall are filmed with a cinema camera). The immersive images may therefore be rendered from various points of view (see steps 120-124) to provide a background simulating movement of the cinema camera.

In some embodiments, receiving 102 the text prompt may include the use of a large language model (LLM) 300 or other generative artificial intelligence model. The use of the LLM 300 will include the use of various types of text prompts. Accordingly, the text prompt used to generate an immersive projection and corresponding depthmap according to the method 100 is referred to in the following description as a text-to-image prompt. Text prompts input to the LLM are referred to herein as text-generation prompts.

A user device 302 may output a text-generation prompt that is input to the LLM 300. The text-generation prompt may instruct the LLM 300 to generate a text-to-image prompt. Accordingly, the text-generation prompt may specify, as non-limiting examples:

A theme or genre (fantasy, medieval, futuristic, alien)

A listing of dynamic living entities (man, woman, animal, mythical creature, alien)

A listing of static living entities (trees, shrubbery, algae, coral, etc.)

A listing of mechanical entities (vehicles, weapons, tools, etc.)

A listing of structures (homes, roads, bridges, etc.)

A listing of relative locations of any of the above-described entities.

A listing of actions performed by or to any of the above-described entities.

The LLM 300 receives the text-generation prompt and outputs a text-to-image prompt that will have additional details for concepts referenced in the text-generation prompt. The text-to-image prompt may be in the form of text, one or more data structures (JavaScript Object Notation (JSON), or other type of object). A data structure may specify attributes, locations, or other information for entities referenced in the text-to-image prompt. In one example, the text generation prompt may include the following instruction to the LLM "You are the holodeck AI and your job is to fill in missing details artfully to create a text prompt, given a vague description of a desired scene from a user." The LLM 300 may then output data structures, e.g., in JSON format, describing components of a scene to be generated. The data structure may include a plurality of text-to-image prompts and instructions for combining resulting first and second non-immersive images, e.g., remove the background from one or more first non-immersive images and composite the remaining portions (e.g., human characters, animals, other objects) of the one or more first non-immersive images with one or more a second non-immersive images at locations specified in the data structure to obtain a final non-immersive image.

The text-generation prompt will then be processed according to a text-to-immersive projection method 100 described above with respect to FIG. 1. The immersive projection and corresponding depthmap resulting from the method 100 may then be provided to the user device 302, such as in the form of an automatically generated rendering of the immersive projection with simulated camera movement (steps 120-124), display in a VR or AR head set (steps 118, 126, and 128), display on an LED wall (step 130), or on a glasses-free holographic 3D display.

A user may then wish to make a change to the immersive projection and corresponding depthmap. The user may then provide an additional text-generation prompt to the LLM 300. In some embodiments, the LLM 300 has a state 304, e.g., the ability to converse such that the response to a text-generation prompt may be a function of one or more previous text-generation prompt and text generated by the LLM 300 in response to the one or more previous text-generation prompts. Accordingly, subsequent text-generation prompts following an initial text-generation prompt may reference the initial text-generation prompt and/or any previous text-to-image prompts. For example, the user can instruct the LLM 300 to remove an entity, add an entity, specify additional attributes for an entity, specify additional actions, specify additional or different thematic elements, or provide any other replacement or additional instructions to the LLM 300. The LLM 300 will receive the subsequent text-generation prompt, generate an updated text-to-image prompt based on the subsequent text-generation prompt and the state 304 of the conversation with the user and again input the text-to-image prompt to the method 100. The LLM 300 may further update its state 304 based on the subsequent text-generation prompt and the updated text-to-image prompt. This process may continue for any number of iterations of subsequent text-generation prompts.

In some embodiments, the text-generation prompt may describe audio to be generated. The LLM may, in response to the description of audio to be generated, output a data object, including a more detailed description of the audio to be generated. The data object may then be used to obtain audio data from a database, may be input to an audio-generation machine learning model trained to generate audio data in response to a text prompt, or may be processed using a text-to-speech machine learning model to obtain audio data. By whichever approach, the audio data obtained based on the data object may then be used as the audio track for video generated according to the methods described herein.

Figure 4:
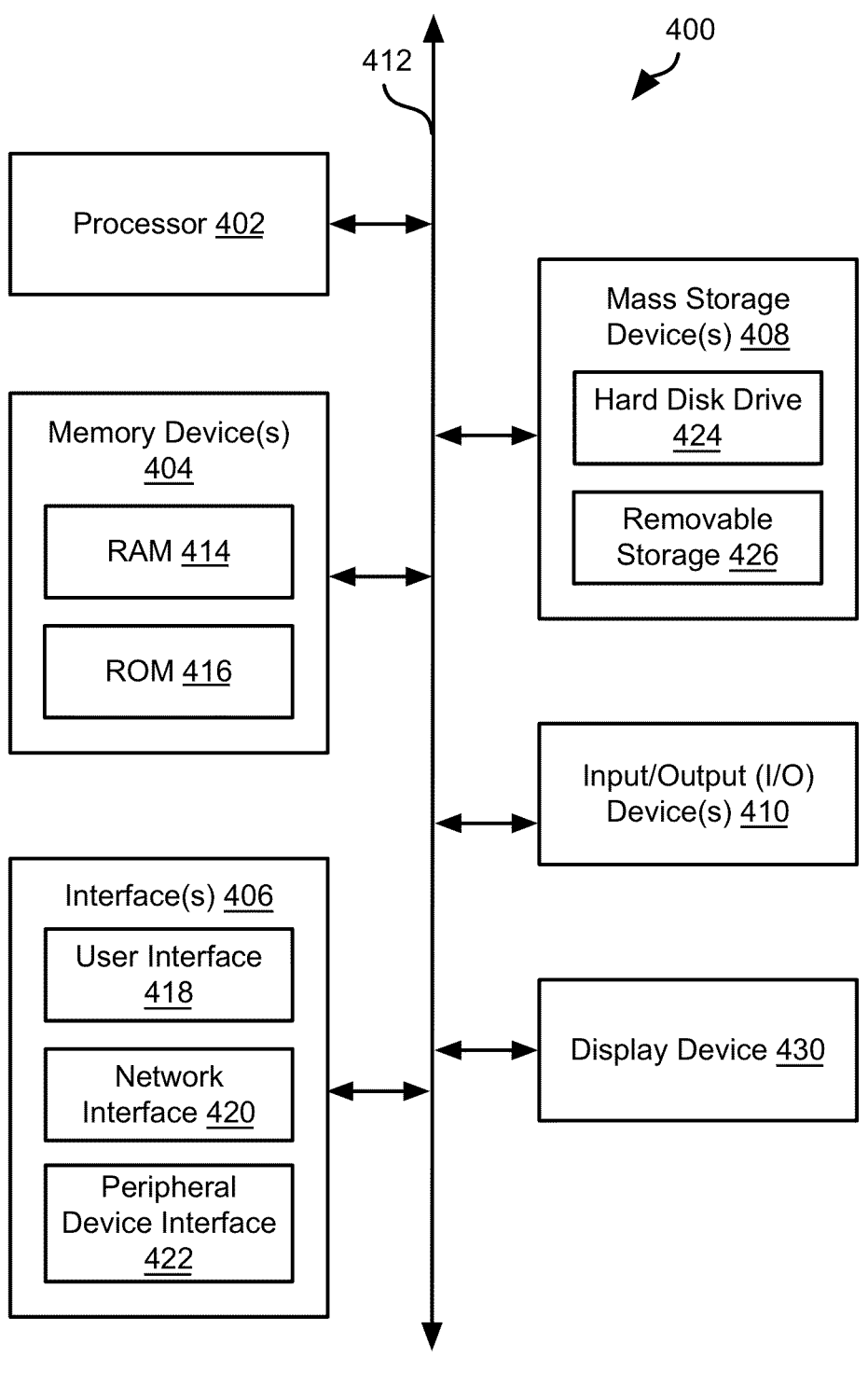
FIG. 4 illustrates an example block diagram of a computing device.

FIG. 4 illustrates an example block diagram of a computing device 400 suitable for implementing the systems and methods described herein. In some embodiments, a cluster of computing devices interconnected by a network may be used to implement any one or more components of the systems discussed herein.

Computing device 400 may be used to perform various procedures, such as those discussed herein. Computing device 400 can function as a server, a client, or any other computing entity. Computing device can perform various functions as discussed herein, and can execute one or more application programs, such as the application programs described herein. Computing device 400 can be any of a wide variety of computing devices, such as a desktop computer, a notebook computer, a server computer, a hand-held computer, tablet computer and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or non-transitory memory (e.g., read-only memory (ROM) 416). Memory device(s) 404 may also include rewritable ROM, such as Flash memory.

Mass storage device(s) 408 include various non-transitory computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interface(s) include user interface elements 418 and peripheral device interface 422. The interface(s) 406 may also include one or more user interface elements 418. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A system comprising:
one or more processing devices; and
one or more memory devices operably coupled to the one or more processing devices, the one or more memory devices storing executable code that, when executed by the one or more processing devices, causes the one or more processing devices to perform a method comprising:
receiving a rectilinear image;
generating a first depthmap from the rectilinear image using a monocular depth estimation algorithm;
generating an immersive projection of the rectilinear image according to a projection mapping and a second depthmap;
generating a second depthmap corresponding to the immersive projection from the first depthmap;
receiving a text-to-image prompt; and
processing the text-to-image prompt with a text-to-image machine learning model to obtain the rectilinear image.

2. The system of claim 1, wherein the immersive projection is one of an F-theta projection or an inflated F-theta projection.

3. The system of claim 1, wherein the method further comprises:
alternatively processing the text-to-image prompt, the alternative processing further comprising:
processing the text-to-image prompt with a text-to-image machine learning model to obtain an original image; and
processing the text-to-image prompt with a superresolution machine learning model to obtain the rectilinear image, the rectilinear image having higher resolution than the original image.

4. The system of claim 1, wherein the method further comprises out-painting the immersive projection using an out-painting machine learning model.

5. The system of claim 4, wherein out-painting the immersive projection comprises:
(a) adjusting a viewing angle with respect to the immersive projection;
(b) generating a rectilinear projection of the immersive projection;
(c) out-painting the rectilinear projection using the out-painting machine learning model;
(d) projecting the rectilinear projection onto the immersive projection; and
(e) repeating (a) to (d) until the immersive projection is completely out-painted.

6. The system of claim 1, wherein the rectilinear image is one of a plurality of images.

7. The system of claim 1, wherein the method further comprises:
identifying a background in the immersive projection; and
removing the background from the immersive projection.

8. The system of claim 7, wherein the method further comprises transmitting a rendering of the immersive projection to an augmented reality display device.

9. The system of claim 1, wherein the method further comprises transmitting a rendering of the immersive projection to three-dimensional display device, the three-dimensional display device being any of a virtual reality display device, three-dimensional display device requiring viewing using glasses, three-dimensional display device that does not require viewing using glasses, or holographic three-dimensional display device that does not require viewing using glasses.

10. The system of claim 1, wherein the method further comprises:
generating a simulated camera movement; and
generating video frames simulating perception of the immersive projection by a camera traversing the simulated camera movement.

11. A non-transitory computer-readable medium storing executable code that, when executed by one or more processing devices, causes the one or more processing devices to perform a method comprising:
(a) receiving a text-generation prompt;
(b) processing the text-generation prompt with a large language model (LLM) to obtain a text-to-image prompt;
(c) processing the text-to-image prompt with a text-to-image machine learning model to obtain an image; and
(d) presenting a representation of the image to a source of the text-generation prompt,
wherein the image is a rectilinear image and (d) further comprises generating an immersive projection and depthmap from the rectilinear image.

12. The non-transitory computer-readable medium of claim 11, further comprising repeating (a), (b), (c), and (d) with a state of the LLM being updated for each iteration of (b) and (b) being performed according to the state of the LLM.

13. The non-transitory computer-readable medium of claim 11, wherein the text-to-image prompt comprises a data object.

14. The non-transitory computer-readable medium of claim 11, wherein the text-to-image prompt specifies locations for objects.

15. The non-transitory computer-readable medium of claim 11, wherein the rectilinear image is one of a plurality of images.

16. The non-transitory computer-readable medium of claim 11, wherein the method further comprises:

identifying a background in the immersive projection;

removing the background from the immersive projection; and transmitting a rendering of the immersive projection to an augmented reality display device.

17. The non-transitory computer-readable medium of claim 11, wherein the method further comprises transmitting a rendering of the immersive projection to a three-dimensional display device, the three-dimensional display device being any of a virtual reality display device, three-dimensional display device requiring viewing using glasses, three-dimensional display device that does not require viewing using glasses, or holographic three-dimensional display device that does not require viewing using glasses.

18. The non-transitory computer-readable medium of claim 11, wherein the method further comprises:

generating a simulated camera movement; and generating video frames simulating perception of the immersive projection by a camera traversing the simulated camera movement.

19. A system comprising:

one or more processing devices; and one or more memory devices operably coupled to the one or more processing devices, the one or more memory devices storing executable code that, when executed by the one or more processing devices, causes the one or more processing devices to perform a method comprising:

receiving a rectilinear image;

generating a first depthmap from the rectilinear image using a monocular depth estimation algorithm;

generating an immersive projection of the rectilinear image according to a projection mapping and a second depthmap;

generating a second depthmap corresponding to the immersive projection from the first depthmap;

receiving a text-to-image prompt;

processing the text-to-image prompt with a text-to-image machine learning model to obtain an original image; and processing the text-to-image prompt with a superresolution machine learning model to obtain the rectilinear image, the rectilinear image having higher resolution than the original image.

20. A system comprising:

one or more processing devices; and one or more memory devices operably coupled to the one or more processing devices, the one or more memory devices storing executable code that, when executed by the one or more processing devices, causes the one or more processing devices to perform a method comprising:

receiving a rectilinear image;

generating a first depthmap from the rectilinear image using a monocular depth estimation algorithm;

generating an immersive projection of the rectilinear image according to a projection mapping and a second depthmap;

generating a second depthmap corresponding to the immersive projection from the first depthmap; and out-painting the immersive projection using an out-painting machine learning model, wherein out-painting the immersive projection comprises:

(a) adjusting a viewing angle with respect to the immersive projection;

(b) generating a rectilinear projection of the immersive projection;

(c) out-painting the rectilinear projection using the out-painting machine learning model;

(d) projecting the rectilinear projection onto the immersive projection; and (e) repeating (a) to (d) until the immersive projection is completely out-painted.

* * * * *